US010911293B2

(12) United States Patent
Inoue

(10) Patent No.: US 10,911,293 B2
(45) Date of Patent: Feb. 2, 2021

(54) TERMINAL AND INFORMATION PROCESSING METHOD

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 16/228,499

(22) Filed: Dec. 20, 2018

(65) Prior Publication Data
US 2019/0207802 A1    Jul. 4, 2019

(30) Foreign Application Priority Data

Dec. 28, 2017  (JP) ................................ 2017-254553

(51) Int. Cl.
| | |
|---|---|
| *H04L 12/24* | (2006.01) |
| *H04W 68/00* | (2009.01) |
| *G06F 3/12* | (2006.01) |
| *H04W 4/80* | (2018.01) |
| *H04W 84/12* | (2009.01) |

(52) U.S. Cl.
CPC .............. *H04L 41/06* (2013.01); *G06F 3/121* (2013.01); *G06F 3/1236* (2013.01); *G06F 3/1292* (2013.01); *H04W 68/005* (2013.01); *H04W 4/80* (2018.02); *H04W 84/12* (2013.01)

(58) Field of Classification Search
CPC ...... G06F 3/121; G06F 3/1236; G06F 3/1292; H04L 41/06; H04W 4/80; H04W 68/005; H04W 76/14; H04W 84/12
See application file for complete search history.

(56) References Cited

U.S. PATENT DOCUMENTS

| | | | |
|---|---|---|---|
| 9,749,844 B1* | 8/2017 | Sovani ................. | H04W 8/005 |
| 2006/0233114 A1* | 10/2006 | Alam .................... | H04L 41/069 |
| | | | 370/252 |
| 2007/0204051 A1* | 8/2007 | Zhang ............... | H04L 29/12132 |
| | | | 709/230 |
| 2010/0323682 A1* | 12/2010 | Hatayama ........... | H04L 67/2823 |
| | | | 455/422.1 |
| 2014/0308989 A1* | 10/2014 | Tanaka .............. | H04M 1/72527 |
| | | | 455/557 |

(Continued)

FOREIGN PATENT DOCUMENTS

JP      2013-062786 A     4/2013

*Primary Examiner* — Andrew C Oh
(74) *Attorney, Agent, or Firm* — Canon U.S.A., Inc. I.P. Division

(57) ABSTRACT

A terminal that performs wireless communication with an external apparatus includes an acquisition unit that acquires wireless communication information about the external apparatus, a transmission unit that transmits a wireless communication connection request to the external apparatus based on the external apparatus' wireless communication information in a case where the external apparatus' wireless communication information matches wireless communication information about the terminal, and a notification unit that notifies of a mismatch of the external apparatus' wireless communication information and the terminal's wireless communication information in a case where the external apparatus' wireless communication information does not match the terminal's wireless communication information.

12 Claims, 14 Drawing Sheets

(56) References Cited

U.S. PATENT DOCUMENTS

| | | | | |
|---|---|---|---|---|
| 2015/0173578 A1* | 6/2015 | Kim | A47L 9/2894 |
| | | | 15/319 |
| 2015/0189687 A1* | 7/2015 | Kawasaki | H04L 43/12 |
| | | | 370/221 |
| 2015/0382136 A1* | 12/2015 | Mihira | H04W 12/0608 |
| | | | 455/41.1 |
| 2016/0026417 A1* | 1/2016 | Inoue | G06F 3/1292 |
| | | | 358/1.15 |
| 2016/0142839 A1* | 5/2016 | Paladugu | H04R 3/02 |
| | | | 381/82 |
| 2017/0134378 A1* | 5/2017 | Corcoran | H04W 12/003 |
| 2017/0202035 A1* | 7/2017 | Yokoyama | H04W 8/26 |
| 2017/0237817 A1* | 8/2017 | Sharma | H04W 36/08 |
| | | | 370/331 |
| 2018/0069718 A1* | 3/2018 | Terao | H04W 84/12 |
| 2018/0069851 A1* | 3/2018 | Terao | H04L 9/3239 |
| 2018/0124847 A1* | 5/2018 | Nishida | H04W 88/04 |
| 2018/0124860 A1* | 5/2018 | Moritomo | H04W 12/08 |
| 2018/0132143 A1* | 5/2018 | Sirotkin | H04W 88/06 |
| 2018/0213578 A1* | 7/2018 | Tachibana | G06K 7/10722 |
| 2018/0332630 A1* | 11/2018 | Gorajala Chandra | H04L 63/18 |
| 2019/0007929 A1* | 1/2019 | Senderovitz | H04L 41/0853 |
| 2019/0058999 A1* | 2/2019 | Gunasekara | H04W 36/0022 |
| 2019/0205071 A1* | 7/2019 | Inoue | H04W 76/18 |
| 2019/0282095 A1* | 9/2019 | Bedingham | A61B 5/6823 |
| 2019/0320369 A1* | 10/2019 | Yang | H04W 36/14 |
| 2019/0372678 A1* | 12/2019 | Han | H04B 11/00 |

\* cited by examiner

FIG.7

```
IP address=192.168.22.1
MAC address=00:9c:00:12:ac:23
SSID=DIRECT-1F_xx
Key=0123456789
Frequency=5
WiFi Spec=ac
```

FIG.9

```
Connection Service
 Charactaristic
 -IP address    192.168.22.1
 -SSID          DIRECT-1F_XX
 -KEY           0123456789
 -Frequency     5
 -WiFi Spec     ac
```

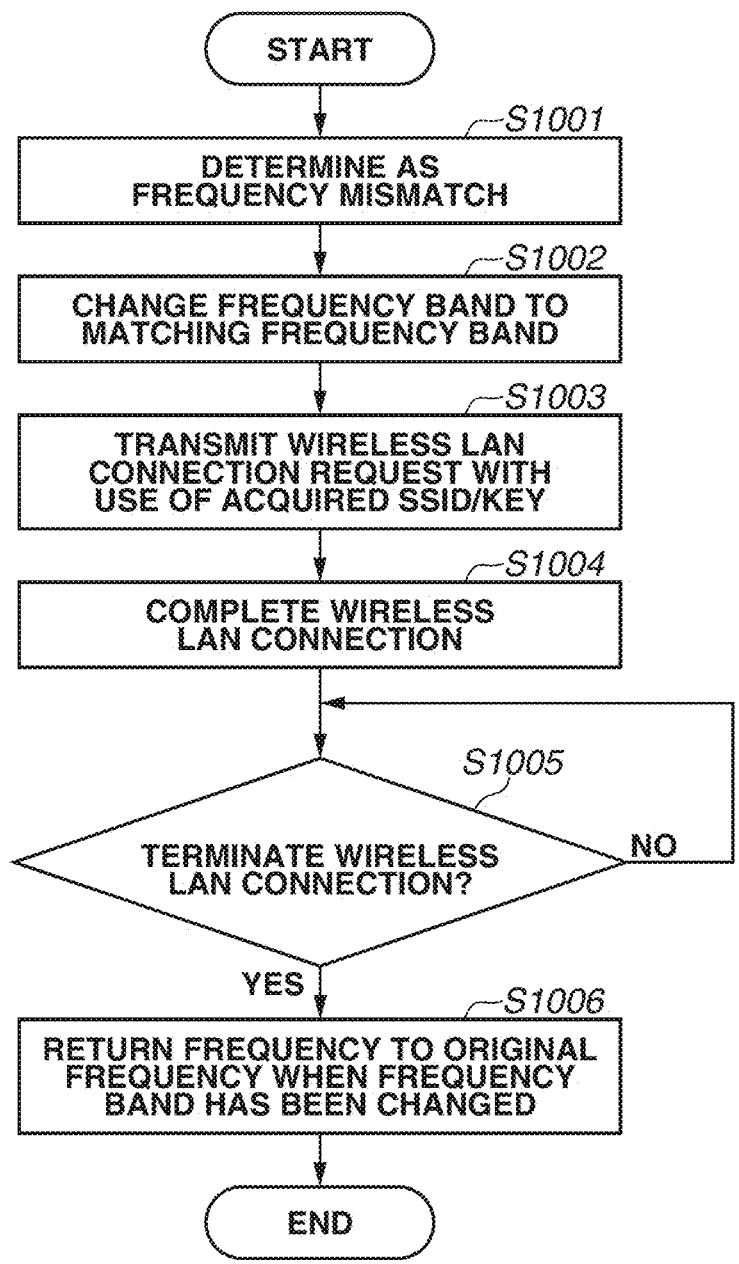

TERMINAL AND INFORMATION PROCESSING METHOD

BACKGROUND

Field

The present disclosures relates to a terminal and an information processing method.

Description of the Related Art

In recent years, as Institute of Electrical and Electronics Engineers (IEEE) 802.11 standards, 802.11ac standard, which is a higher speed standard, has been standardized in addition to 802.11a/b/g/n standards. The 802.11ac/a standards use a frequency band of 5 gigahertz (GHz). The 802.11b/g standards use a frequency band of 2.4 GHz. The 802.11n standard supports both frequency bands of 2.4 GHz and 5 GHz, however, the frequency band of 2.4 GHz is commonly used. A commonly used mobile terminal supports all of the wireless local area network (LAN) standards.

As a connection method of the mobile terminal to an access point, a handover connection method has been widely used (see Japanese Patent Application Laid-Open No. 2013-062786). The access point stores a Service Set Identifier (SSID) and key information thereof in near field communication (NFC) data exchange format (NDEF) data or a QR Code® image. The mobile terminal reads the NDEF data by using the NFC or captures the QR Code® image to acquire the SSID and the key information, and performs wireless LAN connection to the access point using the acquired SSID and key information.

In a case where an operation frequency of the mobile terminal is mismatched with an operation frequency of the access point, the mobile terminal cannot establish connection with the access point. For example, in a case where the mobile terminal operates at the frequency of 2.4 GHz of 802.11n standard and the access point operates at the frequency of 5 GHz of 802.11ac standard, the wireless LAN connection cannot be established because of an operation frequency mismatch. Even when a user uses the mobile terminal to read the NDEF data by using the NFC or to capture the QR codex image, a state where the wireless LAN connection cannot be established continues thereafter, or only a connection error is displayed. Thus, the user cannot recognize a cause of a connection failure.

SUMMARY

According to an aspect of the present disclosure, a terminal that performs wireless communication with an external apparatus includes an acquisition unit configured to acquire wireless communication information about the external apparatus, a transmission unit configured to transmit a wireless communication connection request to the external apparatus based on the external apparatus' wireless communication information in a case where the external apparatus' wireless communication information matches wireless communication information about the terminal, and a notification unit configured to provide notification of a mismatch of the external apparatus' wireless communication information and the terminal's wireless communication information in a case where the external apparatus' wireless communication information does not match the terminal's wireless communication information.

Further features will become apparent from the following description of exemplary embodiments with reference to the attached drawings.

BRIEF DESCRIPTION OF THE DRAWINGS

FIG. 7 is a diagram illustrating an example of data included in a QR Code® image.

FIG. 9 is a diagram illustrating an example of characteristic data.

FIG. 14 is a flowchart illustrating an example of the information processing by the mobile terminal.

DESCRIPTION OF THE EMBODIMENTS

A first exemplary embodiment of the present disclosure is described below with reference to the drawings.

Figure 1:
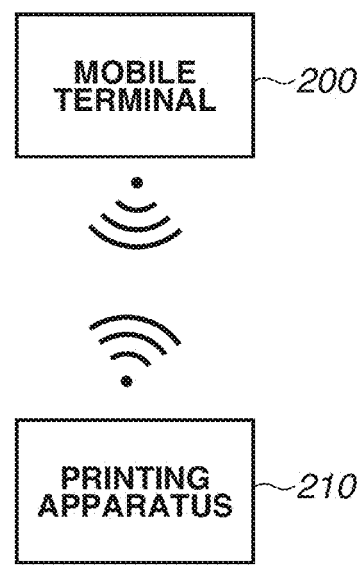
FIG. 1 is a block diagram illustrating an example of a system configuration of a communication system.

A system configuration of a communication system is described with reference to FIG. 1. A mobile terminal 200 includes a wireless local area network (LAN) communication function, and performs direct wireless LAN communication with a printing apparatus 210 that operates in an access point mode. The direct wireless LAN communication of the printing apparatus 210 is not limited to the access point mode and may be another mode including a function that supports the direct wireless LAN connection. For example, the communication may be a Wi-Fi Direct® mode provided by Wi-Fi® Alliance.

Figure 2:
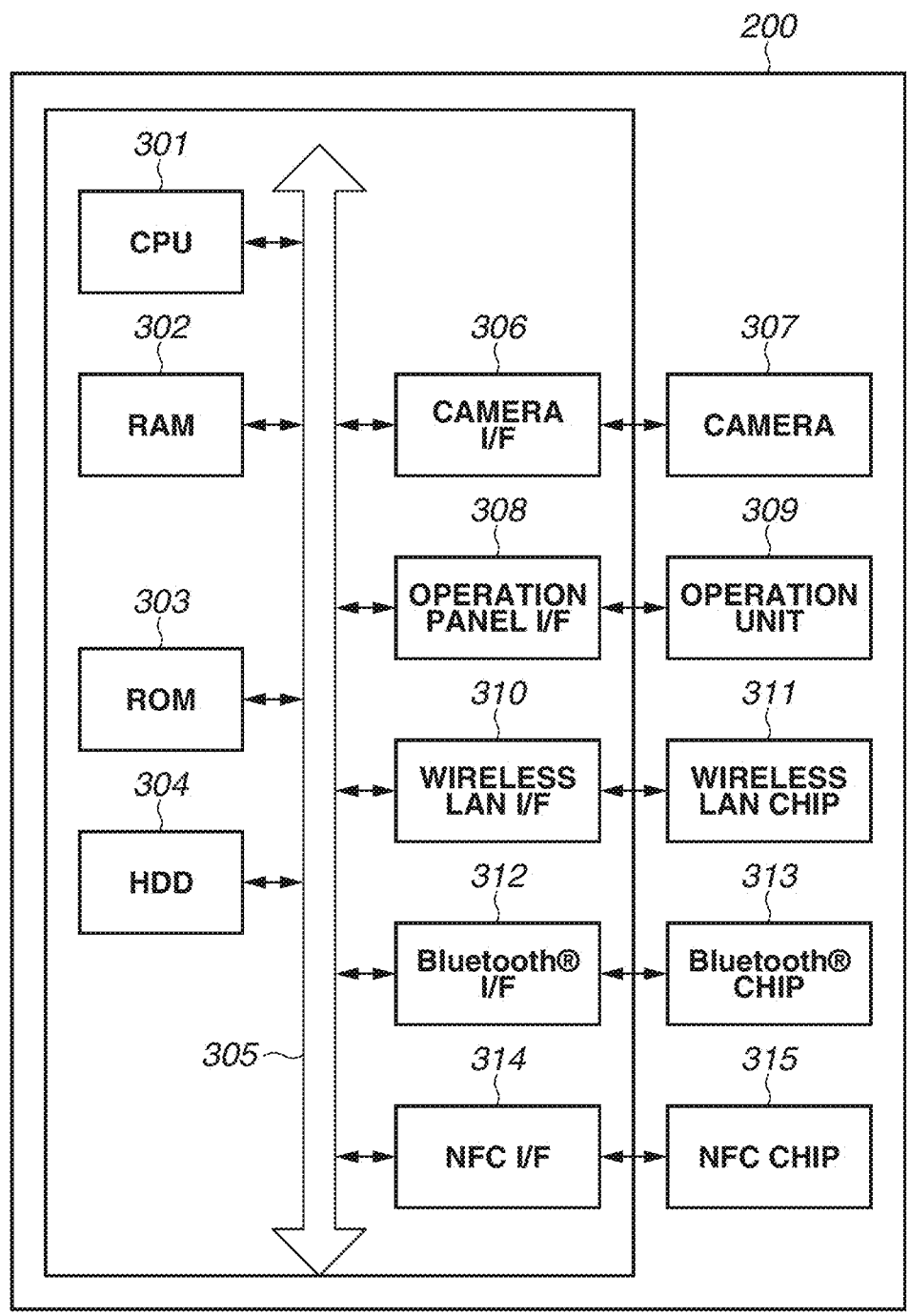
FIG. 2 is a block diagram illustrating an example of a hardware configuration of a mobile terminal.

Next, a hardware configuration of the mobile terminal 200 is described with reference to FIG. 2. The mobile terminal 200 according to the present exemplary embodiment can be a laptop computer or a tablet as long as the mobile terminal includes the wireless LAN function.

A central processing unit (CPU) 301 reads out a program stored in a read-only memory (ROM) 303, and executes various processing to control operation of the mobile terminal 200. The ROM 303 stores the program. A random access memory (RAM) 302 is used as a temporary storage area of a main memory and a work area of the CPU 301. A hard disk drive (HDD) 304 stores various data such as an image.

In the case of the mobile terminal 200, one CPU 301 executes processing illustrated in flowcharts of FIGS. 6, 13, and 14 described below, however, another configuration can be used as well. For example, a plurality of CPUs can cooperate to execute the processing illustrated in the flowcharts of FIGS. 6, 13, and 14.

A camera interface unit 306 performs capturing of a QR Code® image, etc. by a camera 307.

An operation panel interface 308 displays various kinds of images on an operation unit 309 that is a liquid crystal display unit including a touch panel function. A user can input an instruction and information to the mobile terminal 200 using the operation unit 309.

A wireless LAN interface unit 310 executes the wireless LAN communication with an external apparatus such as the printing apparatus 210 using a wireless LAN chip 311.

A Bluetooth® interface unit 312 executes Bluetooth® communication with an external apparatus via a Bluetooth® chip 313. The Bluetooth® communication includes Bluetooth® Low Energy communication.

A near field communication (NFC) interface unit 314 executes NFC communication with an external apparatus via an NFC chip.

Figure 3:
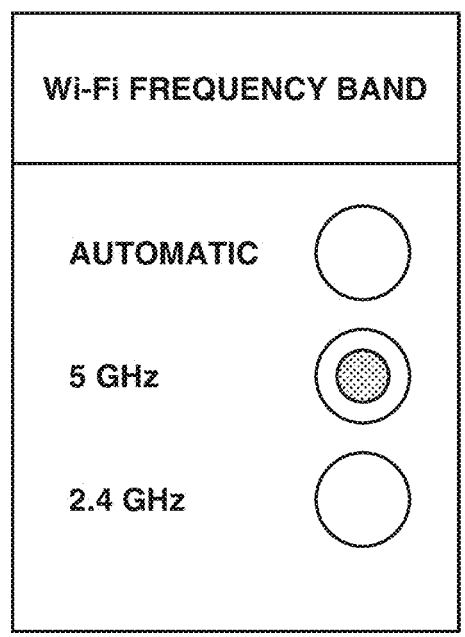
FIG. 3 is a diagram illustrating an example of a user interface (UI) for changing a frequency band of the mobile terminal.

FIG. 3 is a diagram illustrating an example of a user interface (UI) for changing a frequency band in the mobile terminal 200. The UI includes exclusive setting of "AUTOMATIC", "5 GHz", and "2.4 GHz". For example, in a case where the user wants to use 802.11ac standard only, the user selects "5 GHz". As a result, the mobile terminal 200 communicates using just 802.11ac standard. In a case where the user wants to just use 802.11n standard, the user selects "2.4 GHz". As a result, the mobile terminal 200 just communicates using 802.11n standard. "AUTOMATIC" indicates a setting to enable all wireless LAN standards supported by the mobile terminal 200. For example, when the "AUTOMATIC" setting is selected in a case where the mobile terminal 200 supports the wireless LAN standards of 802.11n and 802.11ac, the mobile terminal 200 executes service set identifier (SSID) retrieval in both frequency bands.

Figure 4:
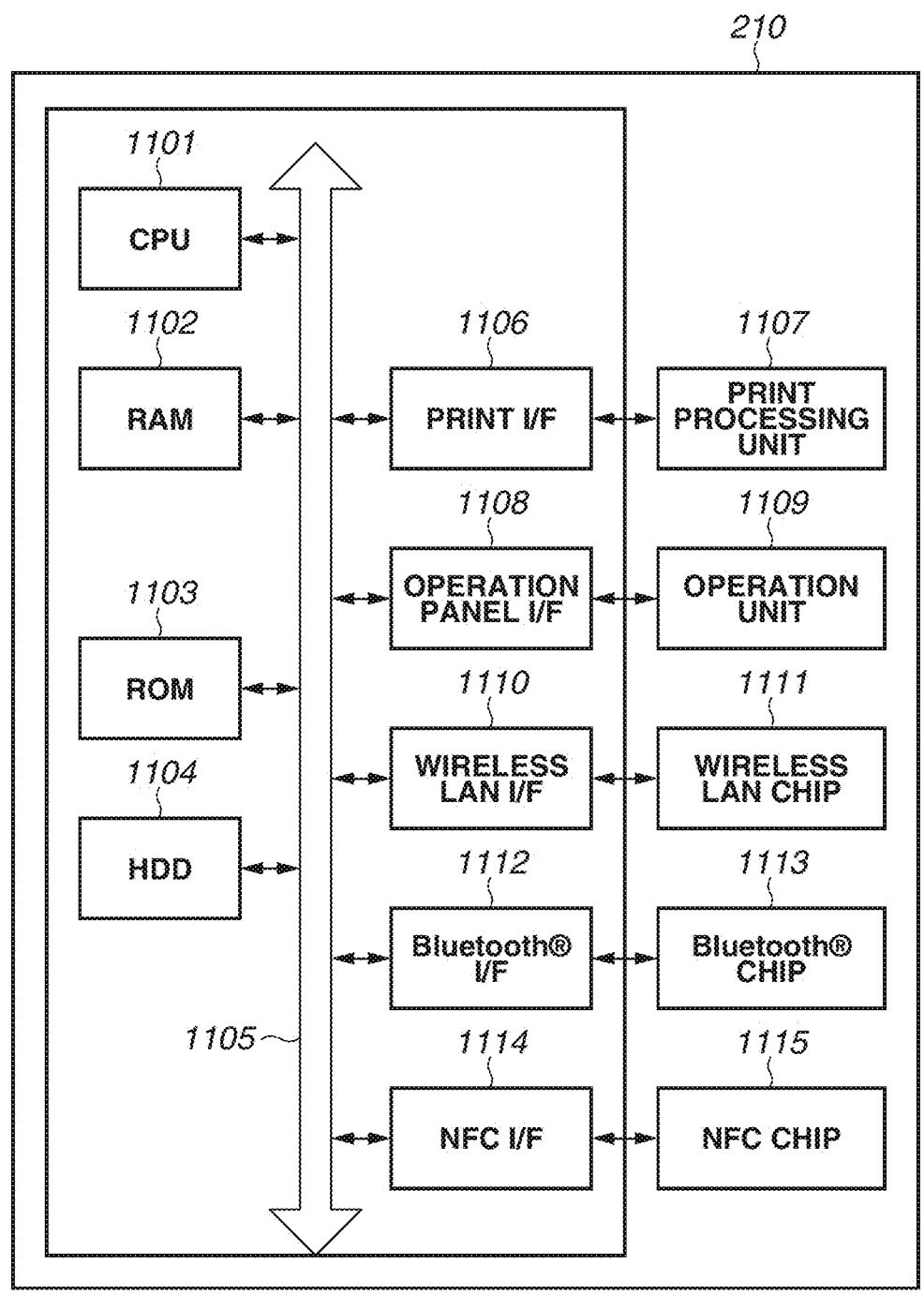
FIG. 4 is a block diagram illustrating an example of a hardware configuration of a printing apparatus.

Next, a hardware configuration of the printing apparatus 210 is described with reference to FIG. 4.

A CPU 1101 reads out a program stored in a ROM 1103, and executes various processing to control operation of the printing apparatus 210. The ROM 1103 stores the program. A RAM 1102 is used as a temporary storage area such as a main memory and a work area of the CPU 1101. An HDD 1104 stores various data such as an image.

In the case of the printing apparatus 210, one CPU 1101 executes processing illustrated in a flowchart of FIG. 12 described below, however, another configuration can also be used. For example, a plurality of CPUs can cooperate to execute the processing illustrated in the flowchart of FIG. 12.

A print interface unit 1106 uses a print processing unit 1107 to perform printing of specified image data and paper discharge processing.

An operation panel interface 1108 displays various kinds of images on an operation unit 1109 that is a liquid crystal display unit including a touch panel function. The user can input an instruction and information to the printing apparatus 210 using the operation unit 1109.

A wireless LAN interface unit 1110 executes wireless LAN communication with an external apparatus such as the mobile terminal 200 via a wireless LAN chip 1111.

A Bluetooth® interface unit 1112 executes Bluetooth® communication with an external apparatus via a Bluetooth® chip 1113. The Bluetooth® communication includes Bluetooth® Low Energy communication.

An NFC interface unit 1114 executes NFC communication with an external apparatus via an NFC chip 1115.

Figure 5:
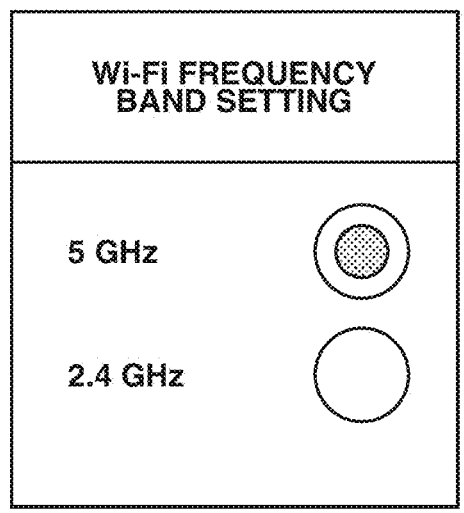
FIG. 5 is a diagram illustrating an example of a UI for changing a frequency band of the printing apparatus.

FIG. 5 is a diagram illustrating an example of a UI for changing a frequency band in the printing apparatus 210. The UI includes exclusive settings of "5 GHz" and "2.4 GHz". For example, in a case where the user wants to just use 802.11ac standard, the user selects "5 GHz". In a case where the user just wants to use 802.11n standard, the user selects "2.4 GHz". In a case where the "5 GHz" setting is selected, the printing apparatus 210 activates the access point mode using the 802.11ac standard. In a case where "2.4 GHz" setting is selected, the printing apparatus 210 activates the access point mode using the 802.11n standard.

Next, information processing in which the mobile terminal 200 acquires frequency band information about the printing apparatus 210 and determines whether the frequency bands are matched is described with reference to a flowchart of FIG. 6.

Figure 6:
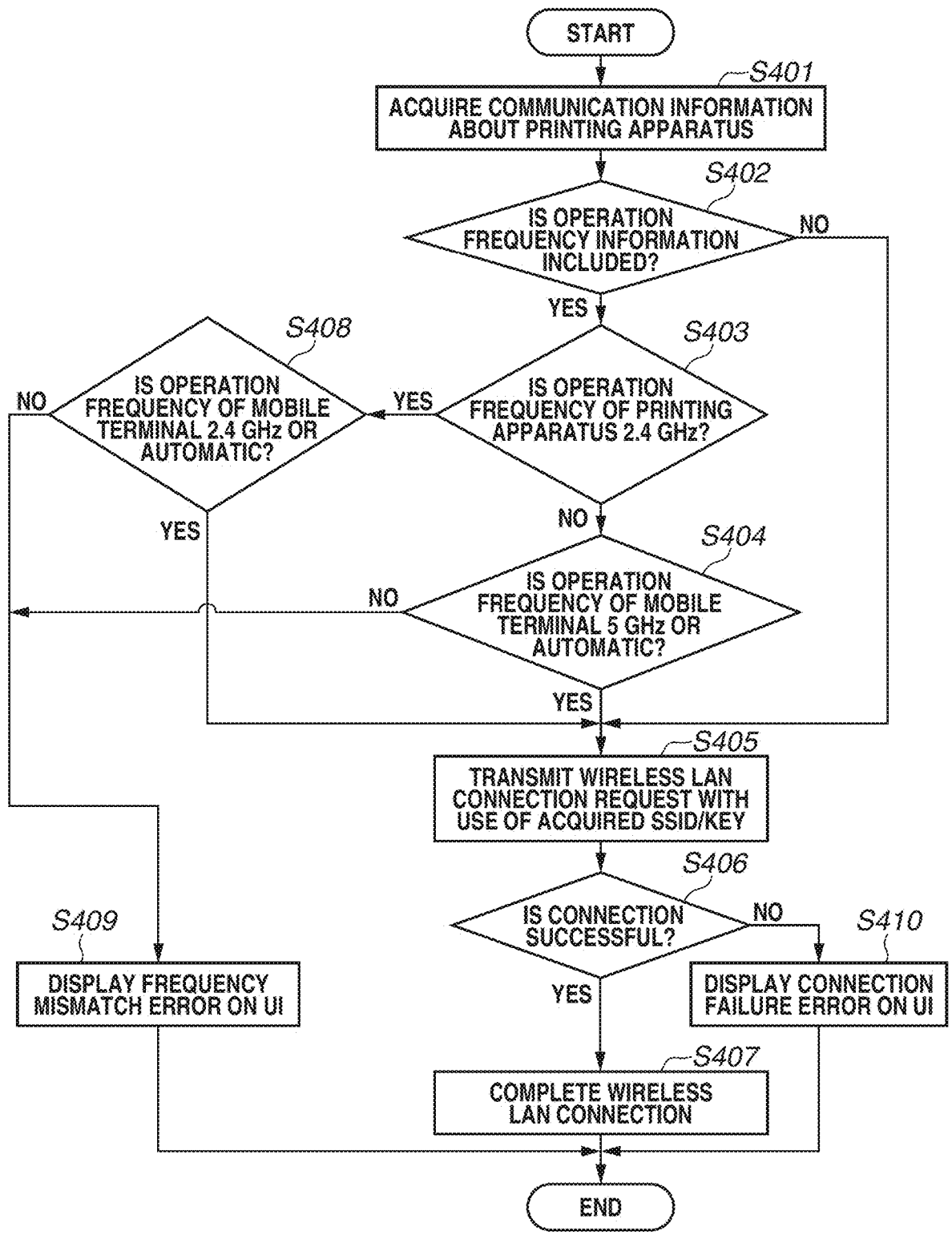
FIG. 6 is a flowchart illustrating an example of information processing by the mobile terminal.

The flowchart in FIG. 6 illustrates processing performed by the mobile terminal 200.

In step S401, the CPU 301 acquires communication information about the printing apparatus 210. The communication information is acquired by, for example, the following methods.

Capturing of a QR Code® image

NFC

Bluetooth®

In a case of capturing of the QR Code® image, the user activates the camera 307 of the mobile terminal 200. If the printing apparatus 210 displays the QR Code® image, the mobile terminal 200 captures the QR Code® image in response to user operation. FIG. 7 is a diagram illustrating an example of data included in the QR Code® image. The QR Code® image stores an internet protocol (IP) address, a media access control (MAC) address, an SSID, and key information about the printing apparatus 210. In addition to this information, the QR Code® image also stores operation frequency band information and wireless LAN standard information about the printing apparatus 210. The example of FIG. 7 indicates that the printing apparatus 210 operates at the frequency band of 5 GHz of the 802.11ac standard.

Figure 8:
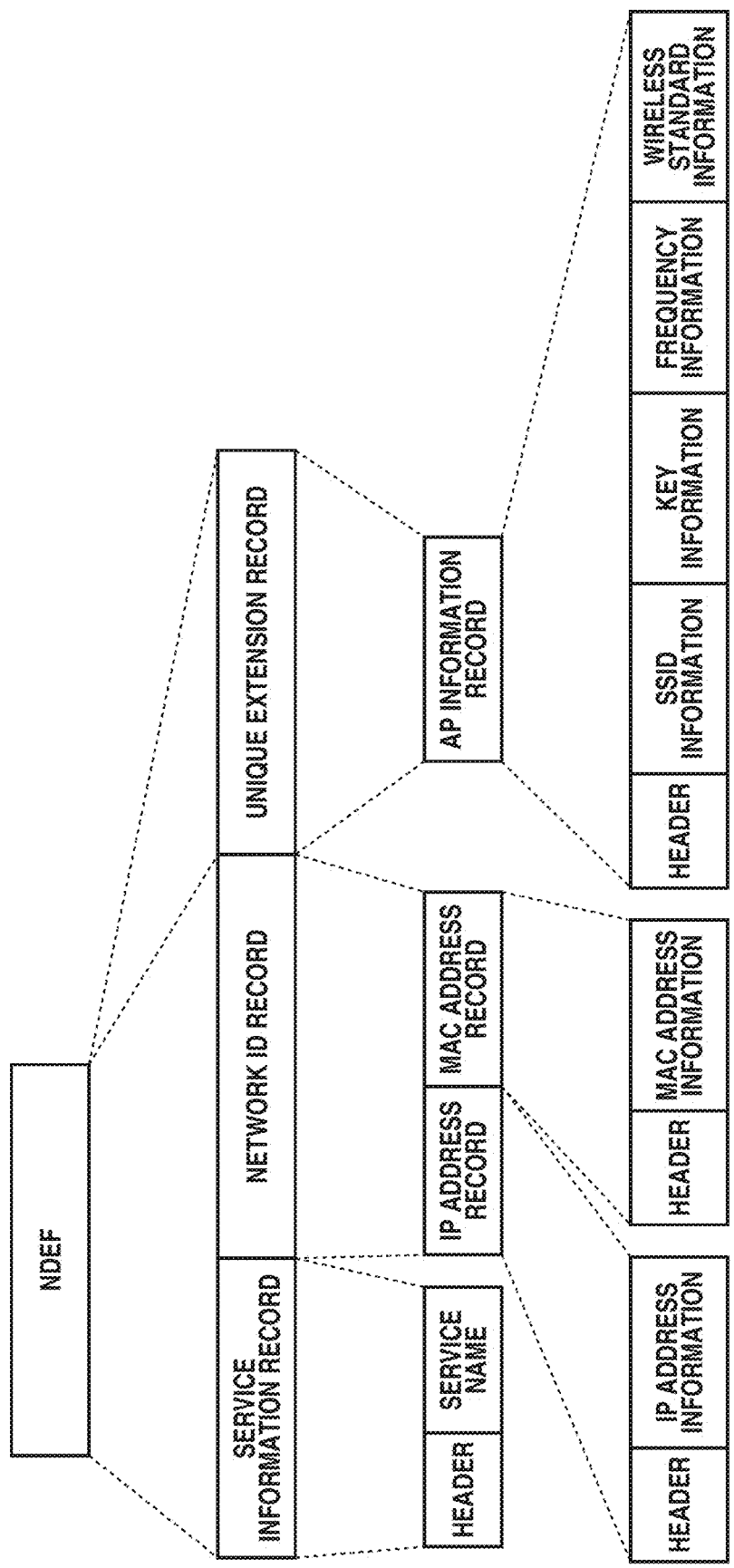
FIG. 8 is a diagram illustrating an example of a data configuration included in near field communication (NFC) data exchange format (NDEF) data.

In the case of NFC, the user brings the NFC chip 315 of the mobile terminal 200 into contact with the NFC chip of the printing apparatus 210. As a result, the mobile terminal 200 acquires NDEF data. FIG. 8 is a diagram illustrating an example of a data structure included in the NDEF data. The IP address and the MAC address at which the printing apparatus 210 operates are stored in a network identification (ID) record region. The SSID, the key information, the frequency band information, and the wireless LAN standard information about the printing apparatus 210 are stored in a unique extension record region.

In the case of Bluetooth®, the mobile terminal 200 acquires detailed communication information about the printing apparatus 210 using the Bluetooth® communication via the Bluetooth® chip 313. For example, in a case where the printing apparatus 210 periodically transmits a Bluetooth® Low Energy beacon, the mobile terminal 200 transmits, when receiving the beacon, a Bluetooth® Low Energy generic attributes (GATT) connection request to the printing apparatus 210 and establishes bidirectional connection. FIG. 9 is a diagram illustrating an example of characteristic data acquired using GATT. The SSID, the key information, the frequency band information, and the wireless LAN standard information about the access point can be acquired.

The CPU 301 acquires the communication information about the printing apparatus 210 by any of the above-described acquisition methods.

In step S402, the CPU 301 determines whether operation frequency information about the printing apparatus 210 is included in the acquired communication information.

In a case where the frequency information is included (YES in step S402), in step S403, the CPU 301 checks the frequency information about the printing apparatus 210. In a case where the operation frequency of the printing apparatus 210 is 2.4 GHz (YES in step S403), the processing proceeds to step S408. In a case where the operation frequency of the printing apparatus 210 is 5 GHz (NO in step S403), the processing proceeds to step S404.

In step S404, the CPU 301 determines whether the operation frequency of the printing apparatus 210 is matched with the operation frequency of the mobile terminal 200. In a case where the operation frequency of the mobile terminal 200 is set to 5 GHz or automatic (YES in step S404), the CPU 301 determines that the operation frequencies are matched, and the processing proceeds to step S405. In a case where the operation frequency of the mobile terminal 200 is set to 2.4 GHz (NO in step S404), the CPU 301 determines that the operation frequencies are mismatched, and the processing proceeds to step S409.

The following descriptions of steps S405, S406, S407, and S410 reflect processing of existing technology but are being provided herein for completeness purposes. In step S405, the CPU 301 transmits a wireless LAN connection request to the printing apparatus 210 using the acquired SSID and key information.

In step S406, the CPU 301 determines whether the wireless LAN connection request has succeeded. For connection request, a frequency mismatch error does not occur because the operation frequencies are matched. However, the wireless LAN connection can fail for other reasons, such as, for example, the number of terminals that have been connected to the printing apparatus 210 by the wireless LAN connection has reached the maximum. In a case where the wireless LAN connection has been normally completed (YES in step S406), the processing proceeds to step S407. In a case where the wireless LAN connection has failed (NO in step S406), the processing proceeds to step S410.

In step S407, the CPU 301 completes the wireless LAN connection between the printing apparatus 210 and the mobile terminal 200. As a result, the mobile terminal 200 and the printing apparatus 210 perform the desired wireless LAN communication.

Figure 10:
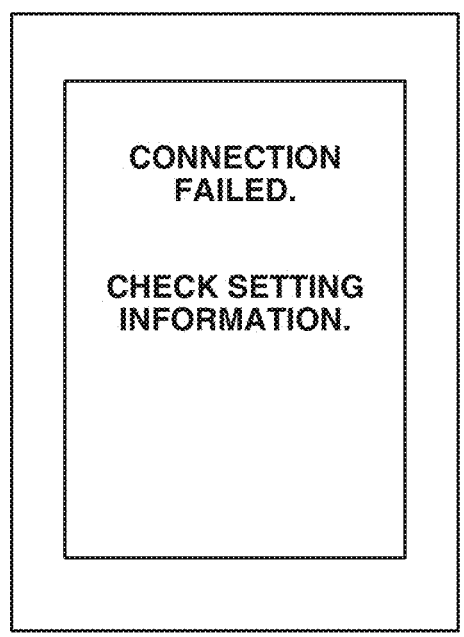
FIG. 10 is a diagram illustrating an example of an error display.

In step S410, the CPU 301 displays an error display as illustrated in FIG. 10 on the operation unit 309. In this case, the CPU 301 transmits the wireless LAN connection request and waits for a response for a predetermined time period or repeats retransmission of the wireless LAN connection request the predetermined number of times, and as a result, the CPU 301 determines that the connection has failed. Thus, it takes time to display the error display, and the user recognizes occurrence of the error after the user has been kept waiting for the predetermined time period.

In step S408, the CPU 301 determines whether the operation frequency of the printing apparatus 210 is matched with the operation frequency of the mobile terminal 200. In a case where the operation frequency of the mobile terminal 200 is set to 2.4 GHz or automatic (YES in step S408), the CPU 301 determines that the operation frequencies are matched, and the processing proceeds to step S405. In a case where the operation frequency of the mobile terminal 200 is set to 5 GHz (NO in step S408), the CPU 301 determines that the operation frequencies are mismatched, and the processing proceeds to step S409.

Figure 11:
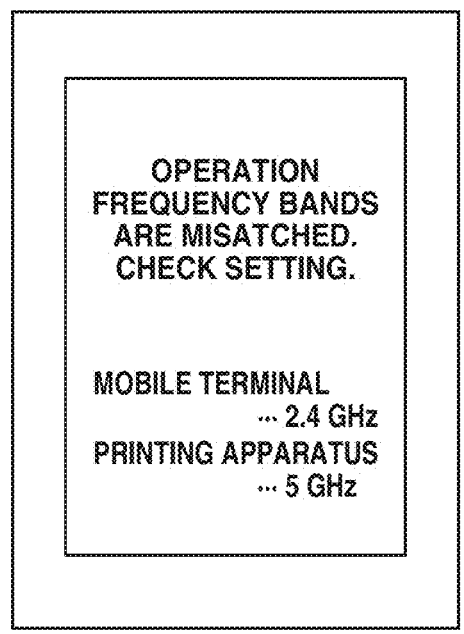
FIG. 11 is a diagram illustrating an example of an error display.

In step S409, the CPU 301 displays, on the operation unit 309, an error display indicating that the connection cannot be established due to mismatch of the operation frequencies as illustrated in FIG. 11. In this case, the mobile terminal 200 can determine that the connection cannot be established, and can display the error display before transmitting the wireless LAN connection request. Thus, the user can recognize an error at an earlier stage than with the existing error display in step S410. The user can understand that the cause of the connection failure is a frequency mismatch.

In a case where the frequency information is not included in step S402 (NO in step S402), as previously indicated, steps S405, S406, S407, and S410 reflect the processing of existing technology. In step S405, the CPU 301 transmits the wireless LAN connection request to the printing apparatus 210 using the acquired SSID and key information. However, it is not certain whether the operation frequencies are matched. Thus, if the operation frequencies are mismatched, the wireless LAN connection can end up in failure. For example, in a case where the mobile terminal 200 operates at the frequency of 5 GHz and the printing apparatus 210 operates at the frequency of 2.4 GHz, a response to the connection request by the mobile terminal 200 is not returned because the frequencies are different from each other even though the SSID and the key information are matched. As a result, a connection error occurs after retransmission of the connection request by the mobile terminal 200 is repeated the predetermined number of times for the predetermined time period. In a case where the connection fails, in step S410, the CPU 301 displays a connection failure screen as illustrated in FIG. 10 on the operation unit 309, however, the user cannot recognize the cause of the error. The wireless LAN connection can fail for other reasons, for example, the number of terminals that have been connected to the printing apparatus 210 by the wireless LAN connection has reached the maximum, even though the operation frequencies are matched. Also in this case, the CPU 301 displays the connection failure screen as illustrated in FIG. 10 on the operation unit 309, however, the user cannot recognize the cause of the error.

Figure 12:
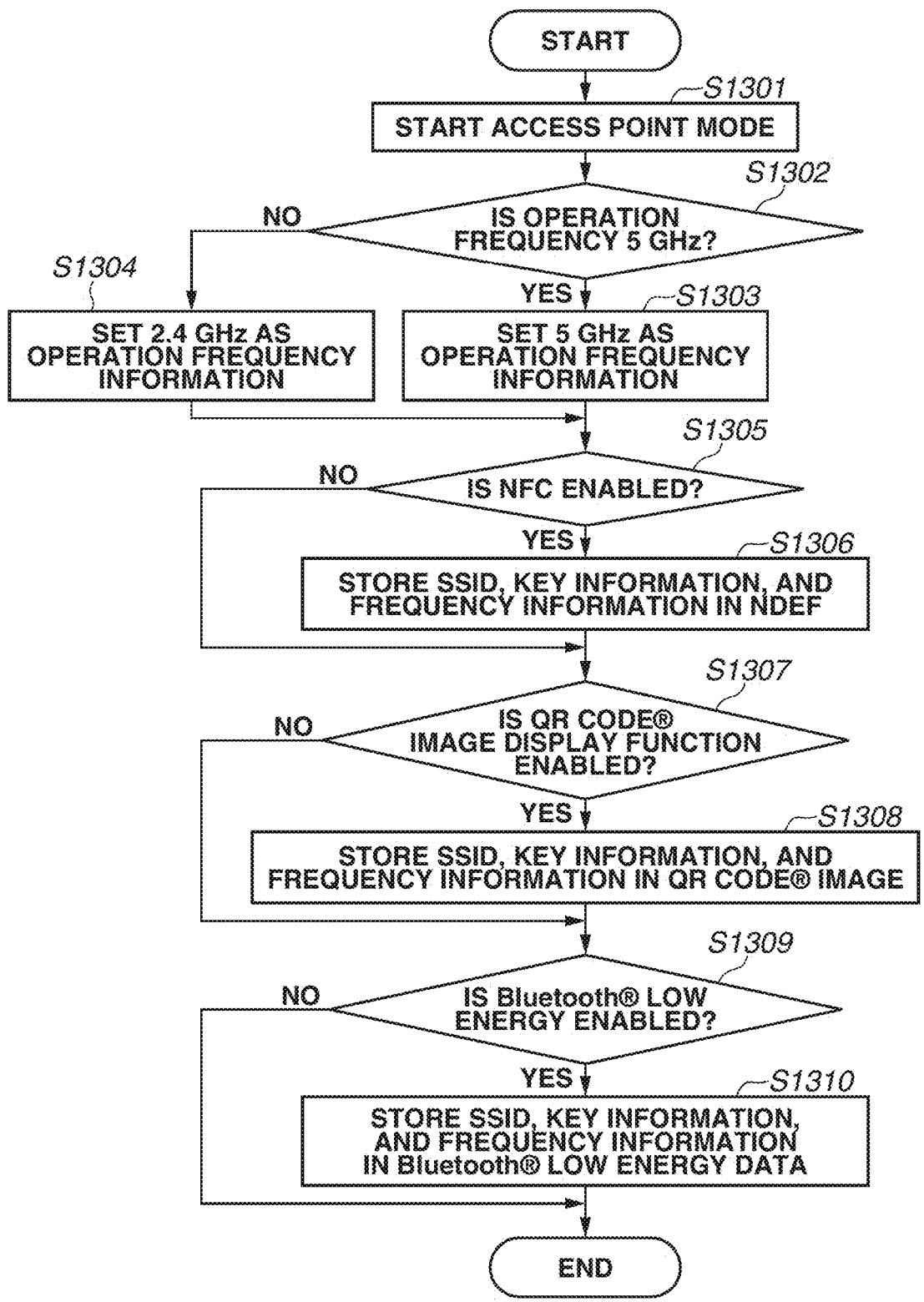
FIG. 12 is a flowchart illustrating an example of information processing by the printing apparatus.

A flowchart illustrated in FIG. 12 illustrates processing performed by the printing apparatus 210.

In step S1301, the CPU 1101 starts the access point mode. The access point mode is started, for example, when the printing apparatus 210 is turned on or when the mode is instructed by using the operation unit 1109.

In step S1302, the CPU 1101 determines whether the operation frequency at the start is 5 GHz or 2.4 GHz. The wireless LAN operation information about the printing apparatus 210 is stored in the RAM, and includes the SSID, the key information, and the operation frequency information. When the frequency is 5 GHz (YES in step S1302), the processing proceeds to step S1303. When the frequency is 2.4 GHz (NO in step S1302), the processing proceeds to step S1304.

In step S1303, the CPU 1101 sets 5 GHz as the operation frequency information in the RAM 1102.

In step S1304, the CPU 1101 sets 2.4 GHz as the operation frequency information in the RAM 1102.

In step S1305, the CPU 1101 determines whether an NFC function of the printing apparatus 210 is enabled. In a case where the NFC function is enabled (YES in step S1305), the processing proceeds to step S1306. In a case where the NFC function is not enabled (NO in step S1305), the processing proceeds to step S1307.

In step S1306, the CPU 1101 stores the SSID, the key information, and the operation frequency information in the NDEF data.

In step S1307, the CPU 1101 determines whether a QR Code® image display function of the printing apparatus 210 is enabled. In a case where the QR Code® image display function is enabled (YES in step S1307), the processing proceeds to step S1308. In a case where the QR Code® image display function is not enabled (NO in step S1307), the processing proceeds to step S1309.

In step S1308, the CPU 1101 stores the SSID, the key information, and the operation frequency information in the QR Code® image.

In step S1309, the CPU 1101 determines whether a Bluetooth® Low Energy function of the printing apparatus 210 is enabled. In a case where the Bluetooth® Low Energy function is enabled (YES in step S1309), the processing proceeds to step S1310. In a case where the Bluetooth® Low Energy function is not enabled (NO in step S1309), the processing in the flowchart illustrated in FIG. 12 ends.

In step S1310, the CPU 1101 stores the SSID, the key information, and the operation frequency information in the Bluetooth® Low Energy data.

The mobile terminal 200 compares the frequency information in the present exemplary embodiment. However, the mobile terminal 200 can compare the wireless LAN standard information such as 802.11n. In a case where the wireless LAN standard information compared matches, the mobile terminal 200 transmits the wireless LAN connection request to the printing apparatus 210. In a case where the wireless LAN standard information is mismatched, the mobile terminal 200 displays a screen and the like for changing the wireless LAN standard information for the mobile terminal 200. In addition, the mobile terminal 200 can compare both the frequency information and the wireless LAN standard information.

As a result, the mobile terminal 200 can acquire the operation frequency of the access point of the printing apparatus 210 from the QR Code® image or the NDEF data. Accordingly, in the case where the operation frequency of the mobile terminal 200 is mismatched with the operation frequency of the access point in comparison before the mobile terminal 200 transmits the wireless LAN connection request to the access point, the mobile terminal 200 notifies the user of the frequency mismatch. This enables the user to recognize the cause of the error.

Figure 13:
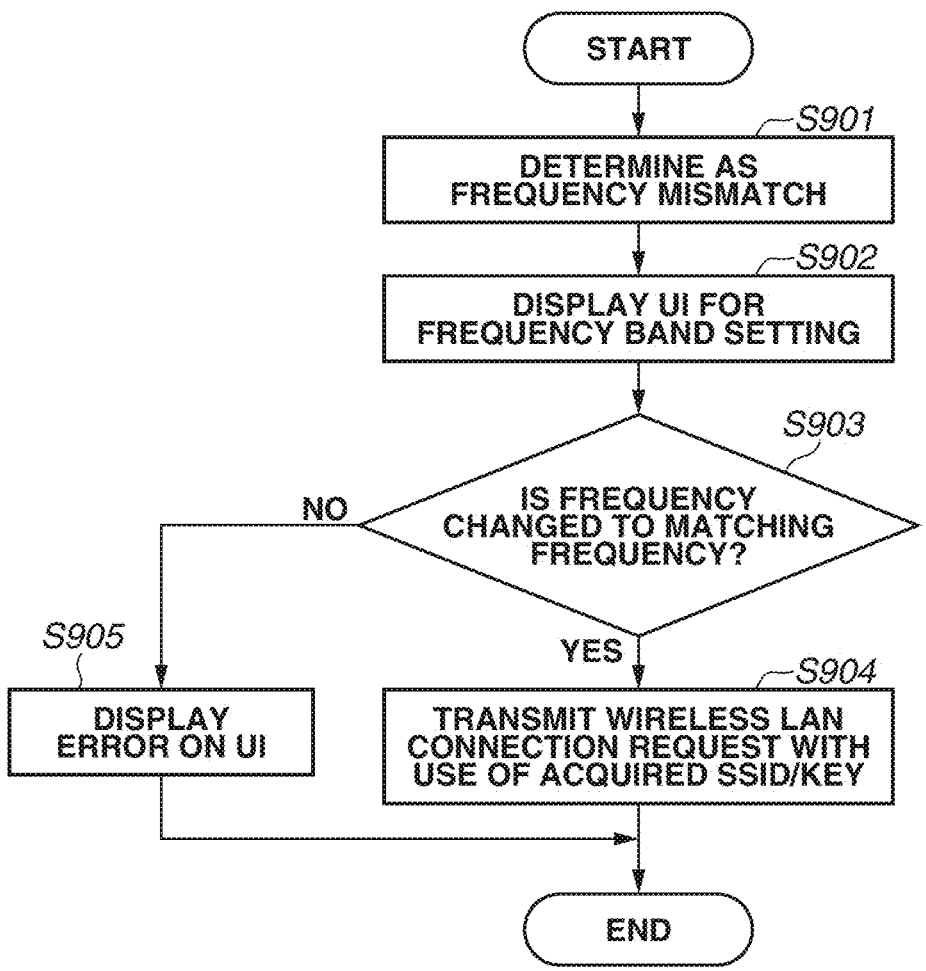
FIG. 13 is a flowchart illustrating an example of the information processing by the mobile terminal.

In a second exemplary embodiment, information processing is described where the mobile terminal 200 compares the operation frequencies and leads to a screen for changing a frequency setting in a case of mismatch with reference to a flowchart of FIG. 13.

The flowchart in FIG. 13 illustrates processing performed by the mobile terminal 200. The processing in FIG. 13 is started when the mobile terminal 200 determines in step S408 of FIG. 6 that the operation frequency of the mobile terminal 200 is mismatched with the operation frequency of the printing apparatus 210.

In step S901, in a case where the operation frequency of the mobile terminal 200 is mismatched with the operation frequency of the printing apparatus 210, in step S902, the CPU 301 displays the screen for changing the frequency setting on the operation unit 309. The screen for changing the frequency setting is, for example, a UI as illustrated in FIG. 3. The UI enables the user to recognize that it is necessary to change the frequency to establish wireless LAN connection with the printing apparatus 210.

In step S903, the CPU 301 determines whether the frequency has been changed to a frequency matching the frequency of the printing apparatus 210. For example, in a case where the printing apparatus 210 operates at the frequency of 5 GHz, the frequencies are matched when the frequency of the mobile terminal 200 is set to "5 GHz" or "AUTOMATIC". Alternatively, in a case where the printing apparatus 210 operates at the frequency of 2.4 GHz, the frequencies are matched when the frequency of the mobile terminal 200 is set to "2.4 GHz" or "AUTOMATIC". In a case where the frequency has been changed to the matching frequency (YES in step S903), the processing proceeds to step S904. In a case where the frequency has not been changed to the matching frequency (NO in step S903), the processing proceeds to step S905.

In step S904, the CPU 301 transmits the wireless LAN connection request to the printing apparatus 210 using the acquired SSID and key information. The wireless LAN connection does not fail because the operation frequencies are matched.

In step S905, the CPU 301 displays, on the operation unit 309, an error display indicating a connection failure due to the frequency mismatch as illustrated in FIG. 11.

As described above, the screen automatically transitions to the screen for changing the frequency setting in the case where the mobile terminal 200 determines that the operation frequencies are mismatched. This enables the user to perform a desired setting change to establish the wireless LAN connection with fewer operational steps.

In a third exemplary embodiment, information processing is described where the mobile terminal 200 compares the operation frequencies and automatically change the frequency setting in a case of mismatch with reference to a flowchart of FIG. 14.

The flowchart illustrated in FIG. 14 illustrates processing performed by the mobile terminal 200. The processing in FIG. 14 is started when the mobile terminal 200 determines in step S408 of FIG. 6 that the operation frequency of the mobile terminal 200 is mismatched with the operation frequency of the printing apparatus 210.

In step S1001, in a case where the operation frequency of the mobile terminal 200 is mismatched with the operation frequency of the printing apparatus 210, in step S1002, the CPU 301 automatically changes the frequency of the mobile terminal 200 to a frequency matching the frequency of the printing apparatus 210. For example, in a case where the mobile terminal 200 operates at the frequency of 2.4 GHz of 802.11n standard and the printing apparatus 210 operates at the frequency of 5 GHz of 802.11ac standard, the CPU 301 automatically changes the operation frequency setting of the mobile terminal 200 to "AUTOMATIC".

In step S1003, the CPU 301 transmits a wireless LAN connection request to the printing apparatus 210 using the acquired SSID and key information. The wireless LAN connection does not fail because the operation frequencies are matched.

In step S1004, the CPU 301 completes the wireless LAN connection between the printing apparatus 210 and the mobile terminal 200. As a result, the mobile terminal 200 and the printing apparatus 210 perform the desired wireless LAN communication.

In step S1005, the CPU 301 determines whether to terminate the wireless LAN connection between the mobile terminal 200 and the printing apparatus 210. When the CPU 301 determines to terminate the wireless LAN connection (YES in step S1005), the processing proceeds to step S1006.

When the CPU 301 determines not to terminate the wireless LAN connection (NO in step S1005), the processing in step S1005 is executed.

In step S1006, the CPU 301 determines whether the operation frequency of the mobile terminal 200 has been automatically changed in step S1002. In a case where the operation frequency of the mobile terminal 200 has been changed, the CPU 301 changes the setting to the original operation frequency.

As described above, in the case where it is determined that the operation frequencies are mismatched, the mobile terminal 200 automatically changes the frequency to the matching frequency, thereby performing the wireless LAN connection. The mobile terminal 200 automatically returns the frequency to the original frequency after the wireless LAN connection ends, which enables establishing the LAN connection without an operation by the user even if the setting is mismatched.

The present disclosure is achievable by processing in which a program achieving one or more functions of the above-described exemplary embodiments is supplied to a system or an apparatus via a network or a storage medium, and one or more processors in a computer of the system or the apparatus read and execute the program. The present invention is also achievable by a circuit (e.g., application specific integrated circuit (ASIC)) achieving the one or more functions.

While examples of the exemplary embodiments of the present disclosure have been described above, these exemplary embodiments are not seen to be limiting.

The above-described exemplary embodiments can optionally be combined with each other to be implemented.

According to the above-described exemplary embodiments, a mobile terminal can acquire the operation frequency of the access point of an external apparatus from a QR Code® image or NDEF data. As a result, in the case where the operation frequency of the mobile terminal is mismatched with the operation frequency of an access point in comparison before the mobile terminal transmits the wireless LAN connection request to the access point, the mobile terminal can notify a user of the frequency mismatch, and the user can recognize the cause of the error.

Consequently, in the case where the wireless connection cannot be established due to a mismatch between the operation frequencies of the wireless LAN or a mismatch between the wireless LAN standards, the mobile terminal can notify the user of the cause.

According to the exemplary embodiments, in the case where the wireless connection cannot be established due to a mismatch of the wireless communication information, it is possible to notify the user of the cause.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-254553, filed Dec. 28, 2017, which is hereby incorporated by reference herein in its entirety.

What is claimed is:

1. A terminal that performs wireless communication with an external apparatus based on a communication standard of IEEE 802.11 series, the terminal comprising:
    a communication interface configured to perform wireless communication based on the communication standard of the IEEE 802.11 series;
    at least one memory that stores a set of instructions; and
    at least one processor that executes the instructions, the instructions, when executed, causing the terminal to perform operations comprising:
    acquiring, by using a method different from any of communication standards of IEEE 802.11 series, connection information for connecting to an access point based on the communication standard of IEEE 802.11 series used for data communication with the external apparatus, and information related to a frequency band used by the access point;
    determining whether or not a frequency band specified based on the acquired information related to a frequency band is a frequency band to which the terminal is connectable;
    in a case where it has been determined that the specified frequency band is not a frequency band to which the terminal is connectable, notifying first error information to a user without trying to make a wireless communication connection request based on the acquired connection information;
    in a case where it has been determined that the specified frequency band is a frequency band to which the terminal is connectable, performing control such that a wireless communication connection request for the access point is transmitted through the communication interface based on the acquired connection information; and
    in a case where connection to the access point based on the wireless communication connection request has failed, notifying second error information different from the first error information.

2. The terminal according to claim 1,
wherein the information related to a frequency band is information indicating a frequency for which the access point provides a wireless communication service.

3. The terminal according to claim 1,
wherein the information related to a frequency band is information indicating which of standards of IEEE 802.11 series a wireless communication service provided by the access point conforms to.

4. The terminal according to claim 1, wherein the connection information for connecting to the access point based on the communication standard of IEEE 802.11 series used for data communication with the external apparatus and the information related to a frequency band used by the access point are acquired by capturing a two-dimensional image displayed by the external apparatus.

5. The terminal according to claim 1, wherein the connection information for connecting to the access point based on the communication standard of IEEE 802.11 series used for data communication with the external apparatus and the information related to a frequency band used by the access point are acquired by using near field communication (NFC) or Bluetooth® communication.

6. The terminal according to claim 1, wherein the first error information includes information indicating that connection to the access point is impossible due to a reason related to a frequency band.

7. An information processing method executed by a terminal that performs wireless communication with an external apparatus based on a communication standard of IEEE 802.11 series, the terminal including a communication interface configured to perform wireless communication based on the communication standard of the IEEE 802.11 series the information processing method comprising:
   acquiring, by using a method different from any of communication standards of IEEE 802.11 series, connection information for connecting to an access point based on the communication standard of IEEE 802.11 series used for data communication with the external apparatus, and information related to a frequency band used by the access point;
   determining whether or not a frequency band specified based on the acquired information related to a frequency band is a frequency band to which the terminal is connectable;
   in a case where it has been determined that the specified frequency band is not a frequency band to which the terminal is connectable, notifying first error information to a user without trying to make a wireless communication connection request based on the acquired connection information;
   in a case where it has been determined that the specified frequency band is a frequency band to which the terminal is connectable, performing control such that a wireless communication connection request for the access point is transmitted through the communication interface based on the acquired connection information; and
   in a case where connection to the access point based on the wireless communication connection request has failed, notifying second error information different from the first error information.

8. A communication method using a first device configured to function as an access point based on a communication standard of IEEE 802.11 series and a second device communicable with the first device,
   wherein the first device functions as an access point of at least one of communication standards of IEEE 802.11 series,
   wherein the first device provides connection information for connecting to the access point and information related to a frequency band used by the access point to the second device, by a method different from any of the communication standards of IEEE 802.11 series,
   wherein the second device having acquired the connection information for connecting to the access point and the information related to a frequency band used by the access point by the different method determines whether or not a frequency band specified based on the acquired information related to a frequency band is a frequency band to which the second device is connectable,
   wherein in a case where it has been determined that the specified frequency band is not a frequency band to which the second device is connectable, the second device notifies first error information to a user without trying to make a wireless communication connection request based on the acquired connection information,
   wherein in a case where it has been determined that the specified frequency band is a frequency band to which the second device is connectable, the second device transmits a wireless communication connection request for the access point based on the acquired connection information, and
   wherein in a case where connection to the access point based on the wireless communication connection request has failed, the second device notifies second error information different from the first error information.

9. The communication method according to claim 8, wherein
   the first device is a printer, and
   the access point provided by the first device is an access point for the second device and the first device to directly perform wireless communication therebetween without using an external access point.

10. The communication method according to claim 9, wherein
   the first device provides the contact information and the information related to a frequency band to an outside by displaying a two-dimensional code including the connection information and the information related to a frequency band on a display unit, and
   the second device acquires the connection information for connecting to the access point and the information related to the frequency band used by the access point, by reading the two-dimensional code displayed on the display unit of the first device.

11. The communication method according to claim 10, wherein
   the first device further includes a near-field wireless communication interface,
   the first device provides the connection information and the information related to a frequency band via the near-field wireless communication interface, and
   the first device tries providing the connection information and the information related to a frequency band by two or more providing methods at least including a first providing method in which the two-dimensional code is displayed on the display unit and a second providing method in which the connection information and the information related to a frequency band are provided via the near-field wireless communication interface.

12. The communication method according to claim 8, wherein the first error information includes information indicating that connection to the access point is impossible due to a reason related to a frequency band.

\* \* \* \* \*